United States Patent

Rayburn

[15] 3,638,086

[45] Jan. 25, 1972

[54] WOUND FILM CAPACITOR

[72] Inventor: Charles C. Rayburn, Falls Church, Va.
[73] Assignee: Illinois Tool Works Inc., Chicago, Ill.
[22] Filed: Mar. 5, 1970
[21] Appl. No.: 16,834

[52] U.S. Cl. .................................................... 317/260
[51] Int. Cl. ................................... H01g 1/14, H01g 3/17
[58] Field of Search ............................... 317/242, 258, 260

[56] References Cited

UNITED STATES PATENTS

| | | | |
|---|---|---|---|
| 2,522,501 | 9/1950 | Brooks et al. | 260/47 |
| 3,009,086 | 11/1961 | Rice et al. | 317/260 |
| 3,153,180 | 10/1964 | Bellmore | 317/260 |
| 3,221,227 | 11/1965 | Devaney | 317/260 X |
| 3,229,174 | 1/1966 | Marchewka | 317/260 |
| 3,283,225 | 11/1966 | Kalstein | 317/260 X |
| 3,391,313 | 7/1968 | Hevey | 317/260 X |

Primary Examiner—Thomas J. Kozma
Assistant Examiner—A. T. Grimley
Attorney—Robert W. Beart, Michael Kovac, Barry L. Clark and Jack R. Halvorsen

[57] ABSTRACT

Wound film capacitor and method of making wherein at least two layers of shrinkable thermoplastic dielectric are sandwiched between two layers of metallized or, preferably, foil, electrodes. A pair of lead wires are then positioned against the outer surfaces of the foils and rotated together in the manner of mandrels to wind the film and foil layers into a capacitor body. Flat, or otherwise deformed portions formed on a short portion of one end of each lead wire which is outside of the capacitor during winding are then drawn into the center of the capacitor by pulling on the other end of the wires. The capacitor body is then heated to shrink the dielectric and thereby cause the leads to be held in extremely firm engagement with the foil layers. Since the foils encircle at least 270° of the periphery of the lead wires, a very firm, low resistance, pressure bond is made which renders the capacitor able to withstand substantial amounts of heat applied during a soldering operation. The elimination of mandrel holes allows the capacitor to be extremely compact and usable for many applications without the addition of additional thicknesses of sealing materials.

6 Claims, 16 Drawing Figures

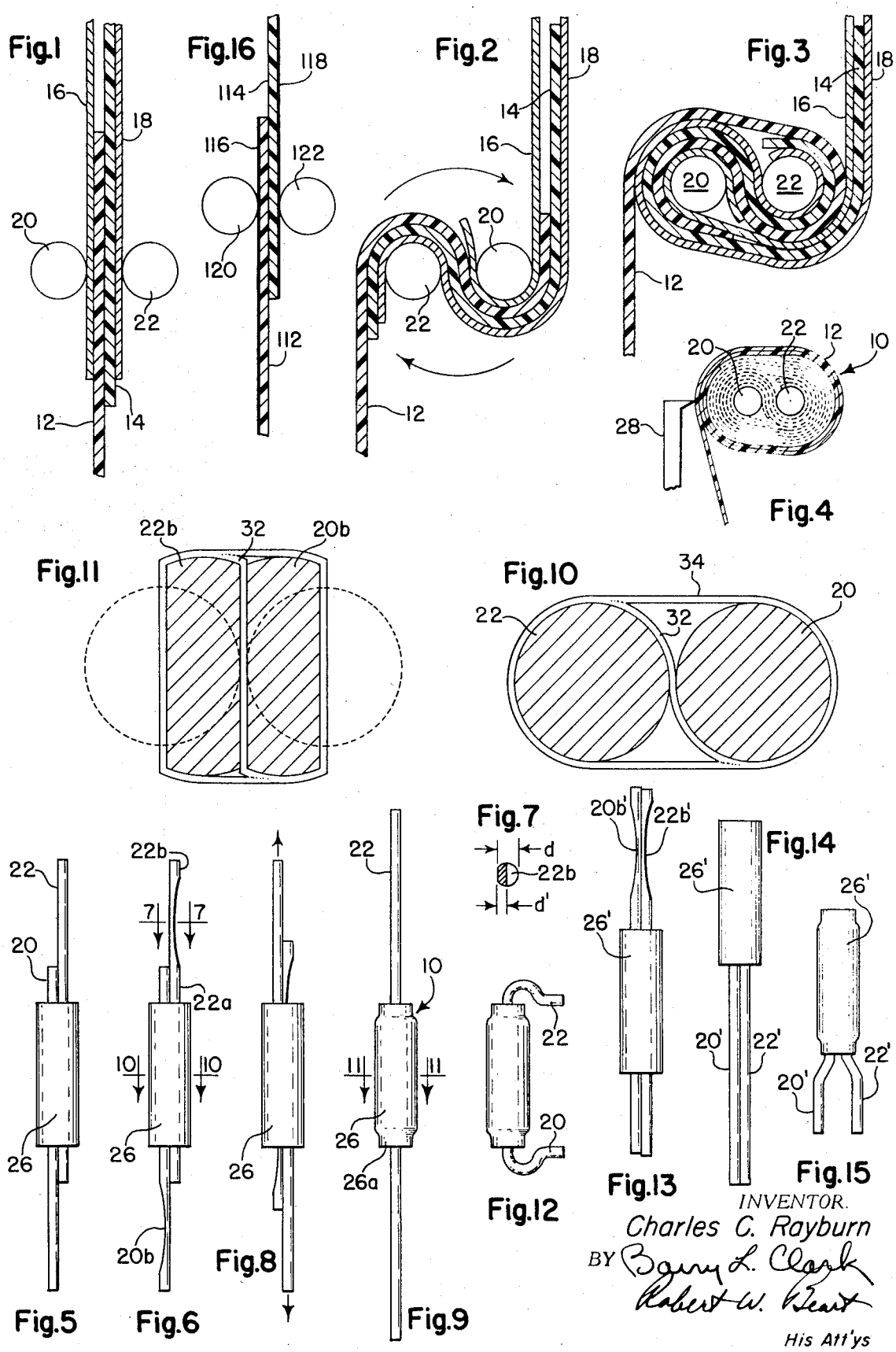

WOUND FILM CAPACITOR

BACKGROUND

Film-foil capacitors are quite widely used because they offer relatively high quality at a relatively low cost. Conventionally, leads have been applied to these capacitors after they are wound, either by soldering them to the ends or by heating them to embed them in the plastic as described and claimed in my U.S. Pat. No. 3,040,415. Attempts have been made in the past to anchor leads to foil strips, such as by soldering, and then to wind the capacitor about the leads and foil strips as exemplified by U.S. Pat. No. 2,579,462 and No. 3,229,174, and German Pat. No. 886,634. Attempts have also been made to wind a capacitor about a pair of wires, one of which could become one of its lead wires with the other being withdrawn after winding, as exemplified by U.S. Pat. No. 2,790,607. An additional patent, U.S. Pat. No. 1,960,944, shows winding a capacitor about a pair of cylindrical insulating tubes with lead wires being inserted through the tubes after winding. Each of these prior art constructions, as well as all other constructions of which I am aware, is limited in its capability of providing one or more of the desirable properties of: compactness, lead strength, economy and simplicity of manufacture, an extended value and voltage range, adaptability to various lead configurations, low contact resistance, a solid core to stabilize performance characteristics and eliminate the tendency to unwind often found in mandrel-wound capacitors, and a large intimate contact area between the foils and the lead wires to conduct and dissipate heat—especially the large quantities of heat often developed as the capacitor is soldered into its circuit application.

SUMMARY

The various deficiencies of the prior art are overcome by the capacitor of the present invention which consists broadly of two or more layers of shrinkable thermoplastic dielectric film positioned, in sandwiched relation, between a pair of foil layers or strips, the outside surfaces of the foil layers being engaged by a pair of axially extending lead wires. The lead wires have flats or other deformations thereon which lock them to the foils after winding and heat shrinking the dielectric and prevent their being rotated in or being pulled out of the capacitor. Since it has been found that the foil and dielectric strips tend to wrinkle when wound about a lead of nonuniform cross section, the capacitor is wound on smooth portions of the lead wires and the deformed lead portions are pulled axially inside the capacitor after the winding has been finished and the wraps sealed together, but prior to the heat shrinking operation.

My improved capacitor utilizes the heat shrinkage characteristics of biaxially oriented films. Such films include polyester, polypropylene, polystyrene, polycarbonate and combinations thereof. A variation in particular performance characteristics such as the dissipation factor and the temperature-capacitance relation, may be obtained by using a particular film or combination of films having the characteristic desired.

The capacitor has the advantage that relatively large, rigid leads are used, e.g., No. 20 or No. 22 AWG. The leads can be formed in either axial, radial or standup styles.

The general extent of the value-voltage range of the capacitor is from about 100 pf.—600 v. to 0.1 mfd.—200 v. although it is of course possible to extend the range beyond these values.

Since the capacitor includes no mandrel hole to occupy space and since it is, for most purposes, able to be used in its own thin self-encasement, it is obvious that it should provide the smallest possible film-foil capacitor obtainable.

Although the capacitor system is designed for self-encasement, a variety of other coating systems are usable as permitted within the style and temperature limitations of the capacitor materials. For example, the units may be epoxy dipped, phenolic dipped and waxed, molded, wrap and filled, potted or canned.

Since the lead wires serve as the winding mandrel and remain in place after winding, there is no possibility of the capacitor gradually unwinding into the mandrel hole as is often possible in conventional winding systems using a retractable mandrel. The solid core of the capacitor produced by the lead wires is thus a basis for stable performance characteristics. Since the lead wires are mounted at one end of the foil strips, the capacitor will have greater self-inductance than the extended foil form of construction wherein the leads are soldered or otherwise in contact with a substantial number of turns of the capacitor.

Unlike conventional heat shrunk tab type construction, such as exemplified by U.S. Pat. No. 2,735,970, the lead wires have pressure contact over the entire foil width and for approximately 270° around their peripheries. This large amount of intimate pressure contact not only assures low contact resistance, but also permits the foils and lead wires to conduct and dissipate heat within the capacitor section and thus protect the dielectric from overheating in localized high temperature areas as the capacitor is soldered into its circuit application. By the provision of deformations such as flatted regions on the leads centrally of the capacitor section, the leads are strongly locked against translation and rotation. In one lead strength test performed on a capacitor made in accordance with this invention, a 16 pound pull was necessary to pull out a lead wire made of wire having a diameter of 0.031 inches which was flattened so as to be reduced in cross section to 0.010 inches in the center of the capacitor. In another capacitor having a lead wire of the same diameter, it took 8 pounds to pull out a lead wire which had been reduced in cross-sectional thickness to 0.015 inches.

My improved capacitor utilizes at least two thicknesses of dielectric between the electrode foils and the lead wires. This double film thickness principally serves to maintain the high dielectric strength and insulation resistance in this critical mandrel region wherein film damage is more likely to occur than in other portions of the capacitor section. The double films, also, however, can tolerate a higher temperature during lead soldering and thus help prevent lead soldering from degrading the dielectric strength of the capacitor. In addition, the presence of a double film between the electrodes and the first turn of the capacitor section reduces the capacitance per unit length of electrode in this region. This factor permits a better yield of low value capacitors by allowing the use of longer electrode foils.

BRIEF DESCRIPTION OF THE DRAWINGS

FIGS. 1, 2 and 3 are end cross-sectional views showing, respectively, the positions of the various foil and dielectric layers (enlarged for clarity) of the capacitor relative to each other and the lead wires: prior to winding; after one-half revolution; and after one full revolution of winding;

FIG. 4 is a diagrammatic end view of the capacitor section illustrating the sealing and cutting off of the outer dielectric layer form its supply;

FIG. 5 is a top plan view of the capacitor immediately after a winding operation;

FIG. 6 is a top plan view similar to FIG. 5 wherein each of the lead wires has been deformed over a short section of its length;

FIG. 7 is an end sectional view of the deformed portion of one of the lead wires in FIG. 6 taken on the line 7—7;

FIG. 8 is a view similar to FIG. 6 illustrating an intermediate position in the pulling apart of the lead wires to bring the deformed sections thereon inside the capacitor;

FIG. 9 is a plan view similar to FIG. 8 showing the relationship of the lead wires to the capacitor after the deformed portions of the lead wires have been pulled completely into the capacitor and the dielectric heat shrunk around them;

FIG. 10 is a diagrammatic end cross-sectional view illustrating the general relationship of the lead wire cross sections and the adjacent capacitor foil and film wraps after a winding operation and before the deformed lead sections of FIG. 6 are pulled into the center of the capacitor;

FIG. 11 is a diagrammatic end cross-sectional view similar to FIG. 10 except that it shows the relationship of the lead wire cross sections to the adjacent capacitor wraps after the deformed lead portions have been pulled into the center of the capacitor and the dielectric film shrunk as in FIG. 9;

FIG. 12 is a view similar to FIG. 9 except that it shows a modification where the lead wires are bent into a radial configuration;

FIG. 13 is a view similar to FIG. 6 except that it shows a modification wherein the wires have been deformed at the same end of the capacitor;

FIG. 14 is a view similar to FIG. 12 showing the leads after they have been pulled into the capacitor;

FIG. 15 is a view similar to FIG. 14 but showing the leads after the capacitor has been heat shrunk and the leads have been bent and cut off to form stand-up leads; and FIG. 16 is a view similar to FIG. 1 illustrating a modification wherein a pair of one-side metallized dielectric strips are used instead of separate strips of film and foil.

DESCRIPTION OF THE PREFERRED EMBODIMENT AND PROCESS

FIGS. 1–9 illustrate the process steps involved in making the improved capacitor 10 of the invention. The winding of the capacitor is shown in FIGS. 1–4. The initial winding step comprises placing at least one pair of thermoplastic dielectric film strips 12, 14 in sandwiched relationship between a pair of foil strips 16, 18. Depending upon the voltage rating that the capacitor must have, the transverse width of the foil strips may be of varying amounts less than the width of the dielectric strips to provide the desired width of insulating margin portions. A pair of elongated lead wire members 20, 22, are placed on opposite sides of the film and foil layers 12, 14, 16, 18 and mounted in a winding head (not shown) which will rotate them in a clockwise direction about a common center between them so as to wind the layers in the manner shown in FIGS. 2 and 3 (which show the relative positions of the various elements after one-half and one full revolution respectively). In FIG. 3, it can be seen that the foil layers 16, 18 will be held in intimate engagement with their respective lead wires 20, 22 over approximately 270° of the wire peripheries. It can be further seen that the foil layers 16, 18 are separated from each other at the center of the capacitor by a double thickness of dielectric material. As previously noted, this double thickness not only protects the dielectric layers against damage in this critical center region of the capacitor, but also increases the amount of heat which may be applied to the lead wires 20, 22 during a subsequent lead soldering operation without damaging the capacitor.

The winding of the capacitor is continued until the desired lengths of the respective foils 16, 18 for the capacitance desired have been wound in and protected by several outer wraps of the plain dielectric strip 12 as can be seen in FIG. 4. When sufficient outer wraps of dielectric 12 have been applied, the wraps may be sealed to each other in any conventional manner such as by gluing or the application of adhesive tape or by heat sealing, utilizing a combination heat sealing and cutting bar 28 in the manner set forth in U.S. Pat. No. 2,950,070.

At the completion of the winding and sealing operation, the capacitor will appear as shown in FIG. 5 with the lead wires 20, 22 extending from either end of the capacitor body member 26. Since the circular lead wires are relatively easily slidable relative to the capacitor body 26, a deformation such as a flattened region 20b, 22b, as seen in FIGS. 6 and 7, is formed on each lead wire 20, 22 by means of a relatively large diameter (about 1 inch) cylinder (not shown) which presses the lead wire against a flat plate (not shown). After the lead wires have been deformed, from a thickness $d$ to a thickness $d'$ which is preferably one-third to one-half the thickness $d$, they are pulled axially relative to the capacitor body 26 (FIG. 8) so as to bring the deformed portions 20b, 22b into contact with the foil layers 16, 18 at the center of the capacitor body. Since the deformation formed by a cylinder in contact with a circular wire member provides a smooth transition section between the two cross sections of the wire, the deformed sections 20b, 22b will readily slip over the surfaces of the foils 16, 18 without injuring them. Although the type of foil used is not extremely critical, it has been found that tin foil provides somewhat better results than aluminum foil for the reason that tin foil will accommodate the heat shrinking of the dielectric without the puckering which is sometimes produced in aluminum foil. Furthermore, tin foil is very malleable and allows the lead wires to slip quite freely over its surface.

After the deformed portions 20b, 22b of the lead wires have been pulled into the center of the capacitor body 26, the capacitor is subjected to heat for a limited period of time in order to cause the dielectric film layers 12, 14 to shrink and thereby exclude air from between the layers and bring the foil layers 16, 18 into firm intimate pressure engagement with the lead wires 20, 22. Although the capacitor, after heat shrinking, (FIG. 9) is ready for use without additional sealing, it is of course possible to apply additional sealing materials if desired or to bend the leads 20, 22 in any manner desired such as into the radial lead style shown in FIG. 12.

The nature of the locking engagement between the lead wires 20, 22 and the most nearly adjacent film and foil layers, indicated collectively at 32, can be seen in FIGS. 10 and 11. FIG. 10, which is a sectional view taken along the line 10–10 in FIG. 6 shows how the layers 32 of the capacitor conform to the lead wire surfaces for about 270° of the periphery of the lead wires 20, 22 when the lead wire cross section is round. In FIG. 11, it can be seen that the degree of peripheral contact of the heat shrunk layers 32 with the flattened lead wires is even greater than 270°. Since the length of the outer periphery of the flattened or otherwise deformed lead wire cross sections 20b, 22b are substantially the same or only slightly greater than that of the circular lead wires 20, 22, the foils 16, 18 will not be damaged as the deformed portions 20b, 22b of the lead wires are slid into the center of the capacitor. A comparison in FIG. 11 of the initial lead wire cross section shown in dotted lines with the final cross section shown in solid lines, indicates that the thickness of the final capacitor will be reduced from its thickness after winding. It can also be seen that the final flattened shape of the lead wires causes them to fill up almost the entire internal volume of the capacitor and thus renders the capacitor more stable.

FIGS. 13–15 illustrate a modified form of capacitor having stand-up, rather than axial, leads. This capacitor style is obtained by merely forming the flatted portions 22a', 22b' on the lead wires at the same end so that when they are pulled into the capacitor body 26', their opposite ends 20', 22' will project in the same direction. After the capacitor body 26' in FIG. 14 is heated to shrink the dielectric, it will assume the shape shown in FIG. 15 at which point the lead wires 20', 22' may be bent in diverging directions and cut off as seen in FIG. 15.

Although the slipped lead concept of the invention set forth herein finds its greatest utility as applied to film foil capacitors, it would also be of some usefulness as applied to capacitors made of two strips of one-side metallized dielectric material. Such strips, shown in FIG. 16 at 112, 114 as having metallized coatings 116, 118 in contact with lead wires 120, 122, would be wound similarly to the film and foil strips previously described. However, since the metallized coatings 116, 118 are of extreme thinness, the lead wires used therewith would have to be extremely smooth to avoid causing damage to them as they were slid over the coatings.

I claim:

1. A wound film capacitor comprising two layers of electrode and at least two layers of dielectric film, a transverse portion of each of said electrode and dielectric film layers being positioned between a pair of lead wires having axial portions about which the layers are wound, each of said electrode strips having a longitudinally extending portion thereof wrapped around at least 270° of the periphery of each lead wire, said lead wires including at least two different cross-sectional configurations along the length thereof which is in contact with said electrodes, the different cross-sectional configurations being connected by a smooth transition section, said dielectric film being heat shrunk to cause the foil electrode strips to be tightly held in intimate, direct pressure friction and mechanical contact with said lead wires.

2. The capacitor of claim 1 wherein the two layers of electrode are separated from each other by at least two layers of dielectric film.

3. The capacitor of claim 1, wherein said layers of dielectric are of a thermoplastic film which is shrinkable upon being subjected to heat.

4. The capacitor of claim 1, wherein said lead wires are of circular cross section except in a central region intermediate the side edges of said electrodes where they are partially flattened, said dielectric layers being formed of a shrinkable thermoplastic film material which is shrunk by the application of heat thereto so as to cause said electrode layers to tightly engage said lead wires and prevent said lead wires from being rotated or moved axially relative to the body of the capacitor.

5. The capacitor of claim 4 wherein said electrodes are strips of metal foil.

6. The capacitor of claim 5 wherein said metal foil is tin.

* * * * *